Dec. 15, 1964  J. L. BARKER  3,161,876
PULSE DOPPLER RADAR SYSTEM
Filed Dec. 7, 1959  2 Sheets-Sheet 1

INVENTOR.
JOHN L. BARKER
BY
ATTORNEY

FIG. 5

INVENTOR.
JOHN L. BARKER

BY

ATTORNEY

United States Patent Office 3,161,876
Patented Dec. 15, 1964

3,161,876
PULSE DOPPLER RADAR SYSTEM
John L. Barker, Norwalk, Conn., assignor, by mesne assignments, to Laboratory for Electronics, Inc., Boston, Mass., a corporation of Delaware
Filed Dec. 7, 1959, Ser. No. 857,830
27 Claims. (Cl. 343—8)

This invention relates to an improved traffic signal control employing ultra high frequency radio waves reflected from a moving vehicle in the roadway to actuate a traffic signal, and to a greatly improved road vehicle detection system using the Doppler effect of reflection of radio waves from a moving vehicle.

More particularly the invention relates to a traffic signal control or traffic detection system deriving brief multiple pulses from a vehicle or successive vehicles passing a desired detection point in the roadway and distinguishing substantially from all other objects and influences.

From one aspect the present invention is an improved traffic signal control or traffic detection system from that disclosed in my copending application Serial Number 511,995, filed May 31, 1955, and called "Control," now U.S. Patent No. 2,965,893 issued December 20, 1960. The present invention, although an improvement over my said copending application Serial Number 511,995, does not obsolete the subject of my said copending application as both inventions are clearly distinguishable although somewhat overlapping.

From another aspect the invention is an improved vehicle detector employing the Doppler effect of reflected high frequency radio wave energies, the radio wave energies being transmitted and received via reflection of the same.

Distinction is made between wave reflection from a stationary body or object and reflection from a moving object by sensing the Doppler shifted frequency and obtaining therefrom a multiple pulse output the minimum of which is two output pulses for a short signal with respect to time. Multiple pulses, in rhythmic oscillation, may be produced in the output by a received Doppler signal of relatively constant amplitude, the number of pulses depending upon the amplitude of the signal and the length of the signal received with respect to time. Multiple pulses out of step with the rhythmic oscillation may be produced in the output by a substantial increase or decrease in amplitude of the Doppler signal as explained below.

The present invention enjoys great utility in the detection of heavy, close, slow moving vehicle traffic, in multiple lanes in the same direction and provides a more faithful representation of the volume of the vehicle traffic detected where the detected vehicles are slow moving in one or more lanes in the same direction, moving close together so that more than one moving vehicle is in the elliptical zone of sensitivity at the same time so that the Doppler shift frequency as reflected by the close, moving vehicles is maintained without interruption.

Traffic actuated control systems employing means for detecting approaching vehicles on one or more lanes of one or more roadways or streets at a traffic intersection are well known for controlling traffic signals.

My said copending application Serial Number 511,995 teaches a radar vehicle detector which from one aspect provides an output actuation pulse whose time length varies in large degree in inverse proportion to the speed of the detected vehicle.

The preferred form of my present invention discloses a radar vehicle detector whose output is concerned with multiple pulses, the number of which is dependent upon the length of the Doppler signal with respect to time and the amplitude of a sustained Doppler signal rather than a single pulse of variable time length.

My improved radar vehicle detector more faithfully reflects the number of vehicles detected during heavy, close and/or slow moving vehicle traffic in more than one lane of travel in the same direction.

Although the preferred form of the present invention herein disclosed and illustrated employs ultra high frequency radio wave energy generation, transmission and reception, other forms of radiant energy generation, transmission and reception, as for example supersonic or ultra sonic radiant wave energy, may be used in lieu of the preferred form.

In a traffic actuated control system controlling traffic at the intersection of two or more roadways, and particularly where one or more roadways include two or more lanes allocated to one direction of traffic, it is sometime desirable to ascertain the approximate volume of vehicular traffic approaching the controlled intersection. In order to obtain such approximate volume of traffic when employing the radar vehicle detector, taught in my said copending application Serial Number 511,995, it may be necessary to employ one of the said radar vehicle detectors taught in the said copending application for each individual lane of each approach to the controlled intersection in which it is desired to ascertain approximate traffic volume. Such traffic actuated control system may include two or more such radar vehicle detectors employed on each approach to the intersection to ascertain such traffic volume.

In accordance with my present invention one of my improved radar vehicle detectors may be employed to provide coverage over two or more lanes of traffic flowing in the same direction and obtain, by use thereof, an approximation of the volume of traffic thus providing a traffic actuated control system including fewer components and thus a more economical control system.

My improved radar vehicle detector produces brief dual output pulses which would correspond to one vehicle of average passenger automobile length traveling at average speed along the roadway. With a reflected Doppler signal, from vehicle traffic, extending in time as if by several close following vehicles moving together so that one vehicle would enter the zone of sensitivity before the vehicle ahead left the zone of sensitivity or by a long vehicle such as a bus or large truck thereby maintaining an uninterrupted reflected Doppler signal, multiple brief output pulses, in excess of two, are produced, the production of which may be adjusted to approximate two brief pulses for each vehicle of average passenger car length that may pass through the zone of sensitivity.

With a reflected Doppler signal of increased amplitude, such as may be produced by two or more vehicles traveling side by side along the roadway in the same direction through the zone of sensitivity, multiple pulses at a somewhat increased pulse rate are produced thereby approximating the traffic volume passing under the radar detector.

These features combine to produce a more accurate approximation of the volume of traffic approaching a controlled intersection and passing under the detector.

It is a general object of the invention to provide a traffic signal control or traffic detection system employing radio reflection which will provide multiple brief output pulses from a reflected Doppler shift frequency signal from a vehicle or vehicles, the number of multiple brief output pulses being dependent upon the length of time the uninterrupted reflected Doppler shift frequency signal is maintained between the moving vehicle or vehicles and the antenna-receiver.

Another object is to provide an improved radar vehicle detector responsive to a received reflected signal Doppler shifted in frequency, the output of which is brief multiple pulses, the number of which are dependent upon the length of time the received reflected signal, Doppler shifted in frequency, is sustained by a moving vehicle or vehicles.

Another object is to provide an improved radar vehicle detector responsive to a received reflected Doppler shift frequency, the output of which is brief multiple pulses, the number of which are dependent upon the amplitude of the received reflected Doppler shift frequency, or Doppler signal.

Other objects will be apparent from the following description and the appended claims.

Figure 1:
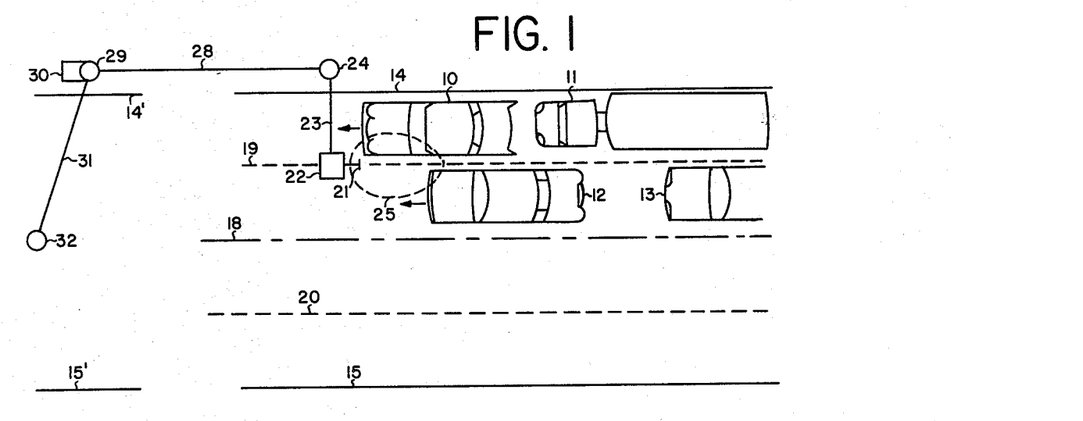
FIG. 1 shows a plan view of a section of a four lane roadway with a radar vehicle detector on the approach to a signal in accordance with one aspect of the invention.

Referring to FIG. 1 in more detail a group of vehicles 10, 11, 12 and 13, four, by way of example, are shown schematically proceeding to the left of the figure, as indicated by the arrows, along a four lane roadway. The lines 14 and 15 represent the outside edges of the roadway with the line 18 as the center line. Broken line 19 divides the upper section of the roadway into two lanes for vehicle travel in one direction and broken line 20 divides the lower section of the roadway into two lanes for vehicle travel in the counter direction.

It should be understood that the group of four vehicles is here illustrative of multiple vehicles in that half of the roadway, that there may be additional vehicles in front and behind the vehicles schematically illustrated or the vehicles may all be in either one of the two lanes for travel in that direction.

Supported over the roadway at an approximately central point between the two lanes serving common directional traffic is an ultra high frequency radio antenna unit 21, illustrated as of the dipole type. This antenna unit is associated with a box or housing 22 which may support or contain the antenna unit and its associated electrical apparatus.

It should be understood that a four lane roadway is illustrated by way of example as the roadway may very well be a two lane roadway with one lane allocated for each direction or a six lane roadway with three lanes allocated for each direction or a one-way street or roadway with several lanes. If the roadway were illustrated as a two lane roadway, allocating one lane in each direction the ultra high frequency radio antenna unit would be illustrated as suspended over the center of one lane, or slightly to the right or outside of the center of the lane in which vehicle traffic is to be detected. If, on the other hand the roadway were illustrated as a six lane roadway, allocating three lanes in each direction the antenna unit would be illustrated as suspended over the center of the middle of the three lanes in which vehicle traffic is to be detected.

The antenna unit 21 is thus supported over the side of the roadway on which it is desired to detect approaching vehicles, as for example over the right side of a roadway on which traffic drives to the right, as illustrated by the group of vehicles approaching the traffic signal 32.

The antenna unit may be mounted over a roadway by means of a supporting arm and connections 23 from a pole or post 24 or may be hung on a wire spanning the roadway or any other convenient means of suspending the unit over a roadway, and directs a beam of ultra high frequency radio waves downward to produce an approximately elliptical pattern 25 on the same side of the roadway only, and with its long axis substantially parallel to the roadway and extending from approximately directly under the antenna unit outward toward approaching traffic.

The edges of the roadways 14 and 15 are indicated as broken and extending on to the left at 14' and 15' to indicate some distance to the signal 32 which may represent a traffic signal, as for example a traffic right-of-way signal associated with an intersection of the road 14–15 with another road, not shown.

The antenna detector unit 21–22 is illustrated as connected via line 23 and line 28 to a pole 29 and associated signal controller 30 and thence along line 31 to control signal 32. The line 31 may also represent a support for signal 32 from the pole or post 29. It will be appreciated that under certain circumstances the radar detector unit 21–22 might be connected directly to control the signal and in other circumstances might be connected to the signal controller 30 which in turn would control the signal 32 as a part of traffic actuated control system. In the latter case the system might involve the use of additional radar detector units on other or all approaches to an intersection for control of the traffic signal.

Figure 4:
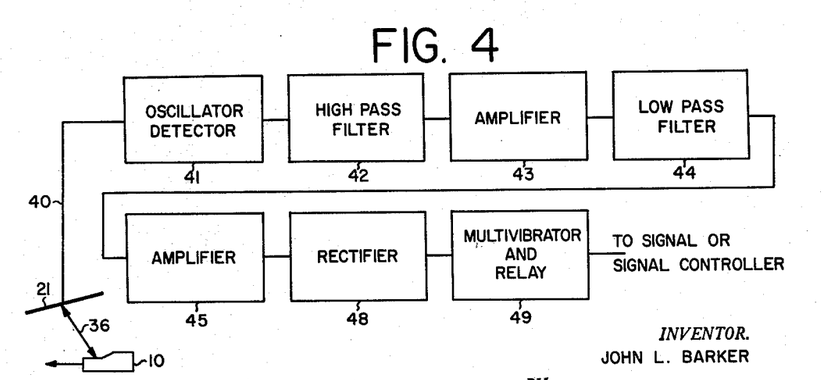
FIG. 4 shows a block diagram of the preferred form of the invention.
Figure 5:
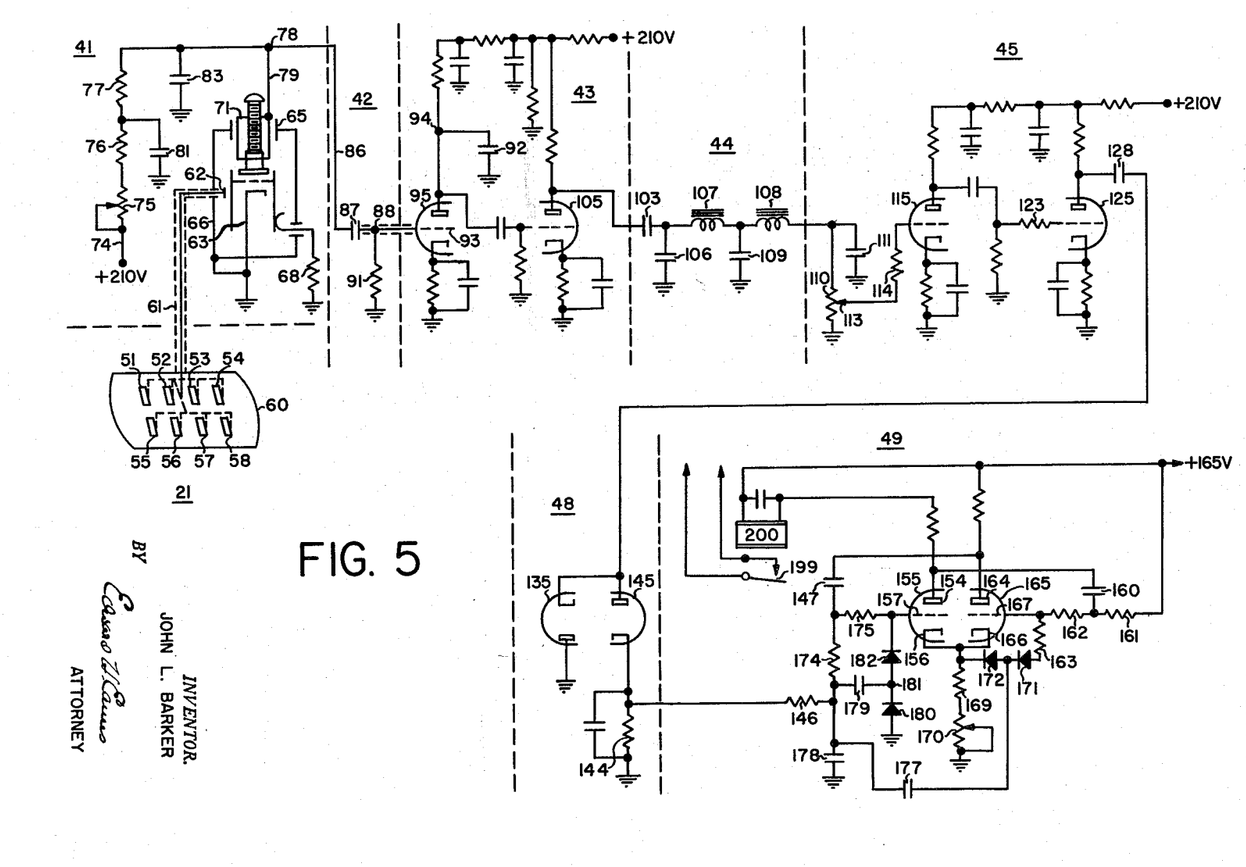
FIG 5. shows a schematic circuit diagram of a preferred form of the invention.

It will be appreciated that antenna unit 21 and its associated electrical circuit apparatus of FIGS. 4 and 5 might be mounted as one unit over the roadway with only its output connection extended to controller 30 or signal 32, or antenna unit 21 alone might be mounted over the roadway and the remainder of its associated apparatus located at the side of the roadway or the pole 24, for example, or the apparatus may be suitably divided between the pole and over the roadway to permit some adjustment of sensitivity, for example, from the side of the road.

Figure 2:
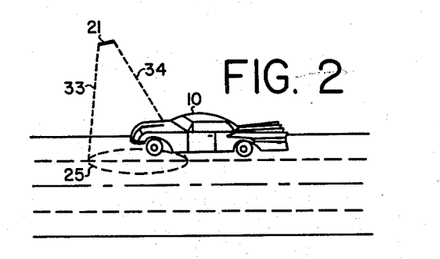
FIG. 2 shows an enlarged elevation view, in perspective, of the radar detector antenna in relation to a roadway and a vehicle thereon.

The preferred relation of the antenna unit to the roadway for detecting approaching vehicle traffic is illustrated more fully in FIG. 2. This figure, in perspective view may be considered another view of FIG. 1 in which the antenna 21 is mounted or suspended above the roadway at a slight angle to the horizontal, which is preferably of the order of 15 degrees. The antenna beam pattern is illustrated by the elliptical broken line 25 which is somewhat longer than it is wide with the wider section closer to the antenna. The broken lines 33 and 34 represent the extremes of the zone of sensitivity, which zone may be expanded or contracted as desired, by a sensitivity control, so that the zone of sensitivity is beyond the half power points.

It will be appreciated that the antenna may be angled away from approaching traffic so as to be actuated by vehicles receding from the vertical, under the antenna, rather than approaching the vertical. If it should be desired to angle the antenna away from approaching traffic, the angle off the horizontal would be the same except in the opposite direction. Angling the antenna in the opposite direction would merely change the position of the zone of sensitivity with relation to the antenna by moving the zone of sensitivity to a position vertically below the antenna and reaching out between the vertical below the antenna and the intersection.

Figure 3:
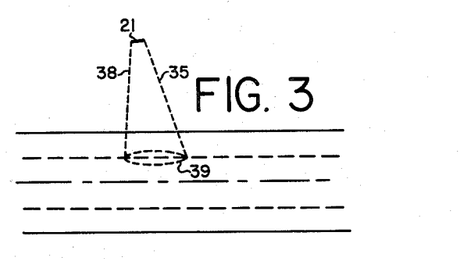
FIG. 3 shows an enlarged elevation view, in perspective, of the radar detector antenna and the pattern of the beam projected on the roadway at half-power points.

Referring to FIG. 3, the antenna 21 is suspended over the roadway as in FIG. 2, however, the zone of sensitivity 39 appears somewhat smaller, in relation to the zone of sensitivity 25 in FIG. 2. FIG. 3 illustrates the antenna beam pattern between half-power points, the angle of which is approximately 30 degrees between lines 35 and 38, the line 38 representing one edge of such beam pattern extending substantially vertically downward from the antenna to the roadway and the outer edge 35 extending down and outward along the roadway toward approaching vehicles at an angle of approximately 30 degrees it will be appreciated that there is a diminishing amount of radiated wave energy somewhat outside of this pattern.

Referring back to FIG. 2, it will be seen that the beam pattern formed by the lines 33 and 34 is somewhat of a larger angle than the beam pattern illustrated in FIG. 3. This increased beam pattern illustrated in FIG. 2, beyond the half power points of the transmitted beam, is obtained by adjustment of the sensitivity control so that the zone of sensitivity 25 is increased in width, and consequently in length to cover more road area, as for example, two lanes or three lanes of the roadway. The entire assembly is adjusted to respond ordinarily to a moving vehicle approximatley at or somewhere beyond the position shown of the vehicle 10 in FIG. 2, for example, although it is understood that this may vary somewhat in actual practice with different types of vehicles and conditions, and in this connection a suitable height for mounting the antenna unit has been found to be approximately 16 feet above the roadway, for example.

Referring now to FIG. 4 a block diagram of the improvide radar vehicle detector with the ultra high frequency antenna unit 21 illustrated at an angle, with relation to the roadbed, over which the antenna is mounted, to transmit a radio beam downward along line 36. The vehicle 10, which also represents a group of vehicles as well as a single vehicle, is illustrated within the elliptical zone of sensitivity and reflects the transmitted radio waves back to the antenna 21 Doppler shifted in frequency. It will be appreciated that all the reflected wave energy from the vehicle 10 will not follow the line 36 but sufficient reflected wave energy will be returned as if by line 36 to enable detection of a vehicle to occur. The ultra high frequency energy for transmission from the antenna 21 and the received reflected energy both travel on a coaxial line 40, the transmitted energy being derived from the ultra high frequency oscillator detector and the received energy, bearing the Doppler shift frequency effect from moving vehicle 10, being mixed in the oscillator detector to provide a Doppler beat frequency output.

Since the radiant wave energy is directed downward at an angle toward the approaching vehicle in a substantially limited pattern, as indicated by the ellipse 25 in FIGS. 1 and 2 and ellipse 39 in FIG. 3, the motion of the vehicle 10 will be at a considerable angle with respect to the radiant energy beam, and actually constantly changing as the vehicle approaches a position vertically under the antenna, and consequently the Doppler frequency shift effect produced on the radiant wave energy by the motion of the vehicle will be very much reduced in relation to the vehicle speed along the road. The Doppler frequency shift will be proportional to the road speed times the cosine of the angle of the latter speed direction with the shortest radial direction to the antenna at each instant of vehicle passage through the beam.

This operation is similar to that explained in my said copending application Serial Number 511,995.

For vehicles moving through the transmitted radio beam the reflected signals appear at the antenna and at the input side of the oscillator mixer at line 40 as a low frequency Doppler modulation of the transmitted ultra high frequency wave energy and, after detection, the Doppler beat signal appears as a low frequency output in the audio or subaudio range at the right side of the oscillator mixer 41, with a transmitted frequency of 2455 megacycles per second, for example.

The oscillator-detector 41, illustrated in block form in FIG. 4 and in full schematic detail in FIG. 5 is similar to that shown in my said copending application. The high pass filter 42, amplifier 43, low pass filter 44, amplifier 45 and rectifier 48, all illustrated in block form in FIG. 4 and in full schematic detail in FIG. 5, are also similar to the comparable parts of my said copending application.

In accordance with the present invention, multiple output pulses from the multi-vibrator cooperating with a direct current operated relay are provided when reflected wave energies, Doppler shifted in frequency, are received by the antenna 21 and are detected in the oscillator detector 41.

A single, isolated vehicle of ordinary automobile length, traveling at ordinary traffic speed, passing through the transmitted beam and reflecting wave energies, Doppler shifted in frequency, will cause a dual pulse output while the passage of closely spaced vehicles or vehicles of a length substantially larger than an ordinary automobile, as for example a truck, bus, or cab and trailer, through the transmitted beam at ordinary traffic speeds so as to reflect the radiant wave energy Doppler shifted in frequency will cause multiple output pulses, in excess of two, according to the length of time the reflected Doppler shifted frequency is sustained.

There are also times when two or more vehicles are traveling in the same direction side by side. It has been found that under such condition the reflected Doppler signal is substantially stronger than that reflected signal produced from a single vehicle. My present vehicle detector responds to such substantially stronger Doppler signal by increasing the pulse rate of the multiple pulse output so as to produce substantially more output pulses than the number of output pulses produced by a normal or weaker signal of the same length with respect to time.

With the ultra high frequency wave energy beam transmitted from the antenna 21 toward the roadway, a vehicle or vehicles passing through the transmitted beam cause reflection of some of the transmitted wave energy, back to the antenna 21, with the reflected wave energy Doppler shifted in frequency. This reflected wave energy, now Doppler shifted in frequency, is received by the antenna 21 and passed via line 40 to the input side of the ultra high frequency oscillator-detector 41. This reflected wave energy is mixed with the generated wave energies of 2455 megacycles, for example, and provides a low frequency modulation of ultra high frequency wave energy which appears as a low frequency output in the audio or subaudio range at the right side of the oscillator-mixer 41, for example, this low frequency output corresponding to the Doppler shift.

This particular low frequency output is distinguished by the filter combination 42–44 having the overall effect of a band pass filter in block 44. The amplified low frequency signal is rectified by the rectifier in block 48 and the resulting direct current voltage signal is applied to the multivibrator 49 which operates to energize a relay and thus give two pulses for an isolated vehicle of ordinary automobile length, traveling at ordinary speed passing through the zone of detection and multiple pulses in excess of two, for vehicles of substantially longer length or groups of closely spaced vehicles passing through the detection zone maintaining an uninterrupted reflection of the Doppler shifted frequencies producing Doppler beat frequencies within the desired band pass.

In the preferred circuit arrangement the low Doppler beat frequency output from oscillator-detector 41 is applied first to the high pass filter 42 which passes frequencies only above a very low level, of the order of 10 cycles per second for example, in order to distinguish from spurious very slow moving reflections, before amplification. The output of the filter 42 is applied to the amplifier 43 and the output of the latter is applied to the low pass filter 44 which cuts off frequencies substantially above the order of 40 cycles per second, for example. The resulting low frequency band of the order of 30 cycles with centering on 25 cycles per second, for example, is applied to amplifier 45.

The output of amplifier 45 is applied to rectifier 48 from which is derived a direct current voltage which voltage is applied to multivibrator 49 for operation of the relay associated with the multivibrator. The output of the relay contacts may be applied directly to a signal or to a signal controller, as desired.

Thus by employing an antenna pattern as described and illustrated, the Doppler beat signal from the moving vehicle is subject to a very large reduction in frequency by the cosine factor which passes essentially through zero as the vehicle passes directly under the antenna unit, and by selection of the Doppler beat signal of low frequency value by means of filtering, it is possible to prevent vehicles approaching the detector at a distance from producing a Doppler shift of low enough beat frequency to get through the audio or subaudio band pass formed by the filter networks. However, as the vehicle approaches close to the antenna unit, the change in cosine of the angle of the radiant energy between the antenna and the vehicle, as this angle approaches ninety degrees in passing, causes each passing vehicle to produce a Doppler beat signal in the low end of the frequency range such that even for high speed vehicles a very low frequency is derived as the vehicle approaches under the antenna unit. This essentially limits the actuation range of the unit to a few feet in advance of the unit.

By using a constant transmitting frequency of the order of 2455 megacycles, for example, and using the entire antenna for continuous transmitting it has been found possible to obtain a narrow antenna pattern as indicated, with a compact eight element dipole in broad side array with each dipole extending substantially horizontally transverse to the road, for horizontal polarization, for best reflection from vehicles and to obtain the cosine factor modified Doppler beat frequency within the range of 10 cycles per second to 40 cycles per second for operation of the output relay only by a vehicle passing substantially under and immediately in advance of the antenna unit.

Angling the antenna unit at about 15 degrees so that most of the energy is directed onto the roadway on the approach side or leaving side also assures that only one Doppler shift frequency is secured for each vehicle traveling under the detector.

With this arrangement also, for higher speed vehicles, the cosine factor must be considerably lower in order for the Doppler beat signal to fall below the high end of the low-pass filter, or in other words, the high speed vehicle must be nearer to the normal under the unit, within the beam pattern, for actuation than the low speed vehicle. Thus with this design the effective range of the detector along the highway is larger for a slow moving vehicle than for a fast moving vehicle, which produces a wave train of larger time length for slower vehicles. For vehicles traveling at very slow speed or vehicles of longer than average automobile length, as for example a bus or a cab and trailer truck or a group of closely spaced vehicles traveling side by side in multiple lanes reflecting uninterrupted signals back to the antenna unit, multiple output signals may be produced, as explained below.

Referring now to FIG. 5 showing the schematic circuit diagram, this diagram is divided into sections, identified with corresponding parts of the block diagram of FIG. 4 by broken lines. Each section in FIG. 5 is identified with a number similar to that used for the corresponding block in FIG. 4.

The description of the circuit of FIG. 5 is as follows:

The antenna assembly 21 is shown schematically at the left of the drawing, the antenna assembly including two columns of four dipoles each, side by side, from dipole 51 to dipole 54 on the top and dipole 55 to dipole 58 on the bottom, all mounted on the reflector backing plate 60.

The antenna assembly is connected via coaxial cable line 61 to the coupling element 62 in the cavity of the ultra high frequency oscillator tube 65. This tube is a conventional coplaner triode of the lighthouse type commercially designated as 2C40 for example, with a reentrant type associated cavity resonator 66.

This oscillator tube 65 generates the ultra high frequency energy which is transmitted via line 61 to the antenna assembly and also receives the reflected wave energy as Doppler shifted in frequency, modified by the cosine factor, with respect to a speed of the vehicle. Thus the generated and reflected wave energies are mixed in the oscillator-detector, and the Doppler beat frequency, that is the Doppler shift frequency difference as modified by the cosine factor, will appear as a periodic change in anode current on line 79, point 78, through resistor 77 and capacitor 81. This change of current produces a periodically varying voltage across resistor 77 in accordance with the low Doppler beat frequency, the oscillator also thus serving as a detector of this low frequency output.

Capacitor 83 serves to partially attenuate high frequency signals outside the desired range. The low Doppler beat frequency signal appearing with respect to ground across resistance 77 and capacitor 83 is applied by line 86 and blocking capacitor 87 and point 88 to the input of the first stage amplifier.

Variable resistor 75 conected at line 74 to a regulated direct current positive power supply serves to control the average anode current supplied across resistors 76 and 77 to the anode circuit 71 of tube 65 thereby providing a means whereby the generated ultra high frequency output of the tube may be controlled.

Bias for the oscillator tube is provided via grid resistor 68 to ground, with the cathode 63 connected to ground and to the cavity resonator 66. The heater circuit for this tube, and those for other tubes in the circuit, are conventional and are not shown.

The Doppler beat frequency signal is partly filtered by the capacitor 87 to resistance 91, the latter resistance being connected between ground and point 88 to control grid 93 of tube 95 of the first stage amplifier. Thus the combination of capacitor 87 and resistor 91 serves as a high pass filter to substantially attenuate frequencies appreciably below 10 cycles per second and pass all frequencies above this level, this combination therefore serving as high-pass filter 42 as in the block diagram of FIG. 4.

The tube sections 95 and 105 and their associated circuits section 43 comprise a conventional two stage resistance capacitance coupled amplifier having relatively high gain, with capacitor 92, providing some bypass to ground from the anode circuit at 94, for high frequencies and noise.

The output of the tube section 105 of this amplifier is coupled from its anode circuit by coupling capacitor 103 to the low pass filter comprising capacitors 106, 109, 111, inductors 107 and 108, and load resistance 114. The inductors 107 and 108 connected in a series with the resistance 110 from the output of coupling capacitor 103 and ground, and the successive shunting capacitors 109 and 111 of this low pass filter, provide substantial attenuation of frequencies above 40 cycles per second with severe attenuation of frequencies appreciable above 60 cycles per second, for example.

Since the high pass filter comprising coupling capacitor 87 and resistance 91 primarily sets the low limit of frequency which can be passed by the circuit as previously described, and this high pass filter rapidly attenuates frequencies below 10 cycles per second and severely below 5 cycles per second, the low pass filter in section 44, and the high pass filter in section 42 together provide a band pass of approximately 30 cycles, with the band pass characteristics of this circuit peaked at approximately 25 cycles per second and with quite rapid attenuation above 40 cycles per second and below 10 cycles per second, although the considerably reduced signals between 10 cycles and 5 cycles and between 40 cycles and 50 cycles may have some limited effect, if the signals are sufficiently strong with high sensitivity adjustment, for example.

It has been found that a band pass arrangement over this range has additional advantages since hum voltages corresponding to 60 and 120 cycles per second from alternating current power supply and related sources are severely attenuated so as not to effect the circuit.

The output of the low pass filter is obtained by adjustment of tap 113 on resistance 110 serving as a potentiometer adjustment of sensitivity of the entire circuit when it is connected into the input of the two stage amplifier illustrated in section 45 and associated with the tube sections 115 and 125.

This is a conventional resistance capacitance coupled amplifier with the addition of series resistance 114 in the grid input to tube 115 and series resistance 123 in the grid input to tube 125 to prevent blocking of the amplifier by any excessive input signal strength.

The output of this amplifier is coupled from the anode circuit of tube 125 via coupling capacitor 128 to the dual diode rectifiers 135 and 145, section 48, the tube section 145 providing a D.C. voltage across load resistor 144 in its cathode circuit of a positive value generally proportionate to the amplitude of the doppler beat frequency signal as attenuated by the band pass filter arrangement. This rectifier is coupled for doubler action so that the maximum voltage can be secured from its output.

The sensitivity controls 110, 113 provide means whereby slight changes in the amplifier gain characteristics and in antenna and radio frequency power output, may be adjusted to provide best operation in response to vehicle actuation.

Since the effective zone laterally with respect to the roadway may be increased by either broadening the antenna beam or increasing the sensitivity of the unit, this sensitivity control also serves as a means for adjusting lateral coverage.

The tube sections 155 and 165 combine to provide a modified form of multivibrator with tube section 165 normally conducting and tube section 155 normally nonconducting. The cathode load resistors including resistor 169 and adjustable resistor 170 combine to provide the cathode bias for both tube sections, at a potential of the order of plus 14 volts, for example, above ground.

The grid 167 of tube 165 is held somewhat above ground potential by the action of the potential divider including resistors 161, 162 and 163 between the positive D.C. supply, of the order of 165 volts for example and diodes 171 and 172 which, in turn are connected to the common connected cathodes 156 and 166. The grid 167, connected to the junction between resistors 162 and 163, is held sufficiently positive to normally maintain conduction through tube 165.

The diode 180 provides a potential, at least at ground level or above at junction 181. In the absence of a signal applied via resistor 146 the junction 181 is held substantially at ground potential by means of the circuits comprising resistors 175, 174, 146 and 144 to ground. Cut-off bias for section 155 is provided by the common positive cathode voltage at cathodes 156 and 166 by the conducting current through section 165 and common cathode resistors 169 and 170.

When the presence of a vehicle is detected the filtered and amplified Doppler signal is applied to the rectifier section 48 and a D.C. voltage is transmitted through the resistor 146, increasing from ground potential to some plus value. This increasing plus voltage through resistor 146 is applied across capacitor 170 through junction 181 and diode 182 to grid 157. When the potential applied to grid 157 reaches sufficient positive value the tube section 155 starts to draw current.

As the section 155 starts to draw current a negative voltage pulse is passed to the capacitor 160, connected between the plate 154 and the junction between resistors 161 and 162, and is applied to grid 167. This negative voltage pulse reduces the positive potential applied to grid 167 thus driving the tube section 165 to cutoff. As the tube 165 goes to cutoff a positive voltage pulse is passed from plate 164 through capacitor 147, resistor 175 to grid 157 to thus increase the positive potential applied to grid 157. A surge of current then passes through the tube 155 and the coil of relay 200 in the plate circuit of tube 155, thus energizing the relay 200 and causing closure of contacts 199.

When the capacitor 179 becomes charged or the amplitude of the signal through resistor 146 becomes stabilized, current is blocked by capacitor 179 through to junction 181. This reduces the potential applied to grid 157. When the tube 165 arrives at complete cutoff, the positive voltage pulse applied to capacitor 147 diminishes and thus also reduces the positive potential applied to grid 157.

With both sources of positive potential substantially reduced the potential applied to grid 157 returns to substantially ground potential and the tube 155 becomes nonconducting. As tube 155 becomes non-conducting a positive voltage pulse is passed through capacitor 160 and is applied to grid 167 thus increasing the positive potential on the grid and tube 165 conducts.

So long as the signal through resistor 146 is maintained, the capacitor 147 will be charged through resistor 174. Such charge upon the capacitor 147 is applied to grid 157 via resistor 175 and when the charge on capacitor 147, and thus the potential applied to grid 157, becomes sufficiently positive, tube 155 will conduct and produce a negative voltage pulse from its plate which pulse is transmitted to grid 167 which in turn causes tube 165 to become non-conductive. When tube 165 becomes nonconductive a positive pulse will pass from plate 164 of tube 165 to capacitor 147 which pulse is applied to grid 157, which in turn causes tube 155 to draw a surge of current to again energize relay 200, all as previously described.

With the signal through resistor 146 maintained, the multivibrator will oscillate between the two tube sections as described above and cause the relay 200 to pulse each time tube 155 passes current, the frequency of oscillation being primarily dependent upon the time constant of resistor 174 and capacitor 147 and the amplitude of the voltage through resistor 146.

With the signal applied through resistor 146, the capacitors 177 and 178 become charged. When the signal through resistor 146 terminates, a negative pulse in the form of a reducing voltage through the resistor 146 is applied across capacitor 178 through diode 171 and resistor 163 to grid 167 to reduce the positive potential applied to grid 167 thus driving the tube 165 to cutoff.

The negative pulse is also applied across capacitor 179 and through diode 180 to ground. The charging of capacitor 147 is terminated.

At the time tube 165 goes to cutoff, the remaining positive charge on the capacitor 147, applied to grid 157, causes the tube 155 to become conductive. The positive pulse from plate 164 resulting from the tube 165 becoming nonconductive is applied via capacitor 147 to grid 157 and causes the tube 155 to conduct a surge of current causing energization of relay 200.

With termination of the signal through resistor 146 the capacitor 147 discharges and grid 157 returns to essentially ground potential. The capacitor 178 discharges and grid 167 returns to a potential somewhat above ground and thus tube 155 becomes nonconductive, producing a positive voltage pulse at its plate which pulse is transmitted to grid 167 increasing the positive potential applied to grid 167 and causing tube 165 to conduct. The relay 200 becomes deenergized when tube 155 becomes nonconductive.

It will be appreciated that a short signal across resistor 146, as for example the signal received from detecting one average size vehicle traveling at or above average speed, will produce an initial pulse of relay 200, as described above, as the signal increases in amplitude. However, since the length of time the signal is maintained, under such condition, is relatively short, and in fact too short to charge the capacitor 147 to sufficiently high potential to cause the tube 155 to pass current without a reduction in the potential applied to grid 167, a second pulse of relay 200 is obtained as tube 155 passes current for the second time in the series, as the signal through resistor 146 decreases, such as described above with reference to the last pulsing of relay 200.

This provides at least a double pulse of relay 200 for a signal of short duration and normal or average amplitude and multiple pulses of relay 200 in the case of a signal of longer duration and/or greater amplitude, the number of pulses depending on the length of the signal, its amplitude, and the value of the time constant of the combination of resistor 174 and capacitor 147.

According to the preferred embodiment of the invention as disclosed herein, oscillation of the multivibrator may be triggered by any substantial increase or decrease in the D.C. signal through the resistance 146 as obtained by virtue of any substantial change in amplitude of the Doppler signal, so long as the D.C. signal through resistance 146 continues above the minimum level necessary to produce initial conduction of the tube section 155. bination of resistor 174 and capacitor 147.

If the D.C. signal through resistor 146 is maintained at a relatively constant voltage, substantially above the minimum level for initial conduction of the tube section, the charging of capacitor 147 through resistor 174 takes place in a shorter period of time thereby increasing the rate of oscillation of the multivibrator. Thus, a high order of control is obtained to secure a number of output pulses commensurate with the volume of traffic.

It will be appreciated that two or more large vehicles, such as trucks or buses traveling side by side in the same direction will provide a substantially stronger and longer Doppler signal than vehicles of ordinary automobile length and thus will produce output pulses at a more rapid rate for a longer period of time than ordinary size automobiles.

If, while the tube section 165 is conducting and before the tube section 155 becomes conducting in the rhythmic oscillation of the multivibrator the D.C. signal varies substantially in amplitude, as for example a decrease in voltage from some plus value above ground to a lower plus value above ground but above the minimum value, through resistance 146, such decrease of voltage will produce a negative pulse that may be passed through capacitor 177, diode 171 and resistance 163 to grid 167, thus reducing the potential on grid 167 causing tube section 165 to become nonconductive thus producing a positive pulse from plate 164 through capacitor 147, resistance 175 to grid 157. The positive pulse applied to grid 157 thus drives the tube section 155 to conduct and pulse the relay 200 out of step, in advance of the next rhythmic oscillation. If the reduced D.C. signal is maintained at a relatively constant level, rhythmic oscillation of the multivibrator at a slower rate will continue as described above.

If, for example, a substantial increase in voltage from some plus value above the minimum value above ground to a higher plus value above ground is obtained through resistance 146 by increased amplitude of the Doppler signal, such increase of voltage, through resistance 146 while tube section 165 is conducting and before tube section 155 becomes conducting in the rhythmic oscillation of the multivibrator, may produce a positive pulse through capacitor 179, point 181 and diode 182 to grid 157 and drive the tube section 155 to a conducting state thus causing a negative pulse from plate 154 to pass through capacitor 160 and resistance 162 to grid 167 thereby reducing the potential on grid 167 and driving the tube section 165 to cutoff so as to produce an out of step pulse of the relay 200. If the increased D.C. signal is maintained at a relatively constant level, rhythmic oscillation of the multivibrator, at a more rapid rate, will continue, as described above.

In its preferred form, oscillation of the multivibrator is such that during a sustained period of oscillation resulting from a relatively constant signal through resistor 146 the individual periods of conduction of tube section 165 are substantially longer than the individual periods of conduction of tube section 155.

With approximately 1.8 seconds between pulses of the relay as caused by conduction of tube section 155 and a pulse length of the order of 0.25 second, a substantial increase or substantial decrease in the signal through resistor 146 tends to advance the next pulse in its rhythmic beat rather than increase the length of the pulse, although in some cases a rapidly increasing or rapidly decreasing signal at the moment of conduction of tube section 155 may result in increasing the period of conduction of tube 155 and thus increase the length of the pulse to a pulse length of 0.5 second or less, for example.

The pulse rate produced by the time constant of the components providing dual output pulses 1.8 seconds apart, in response to passage of a single average size automobile traveling at normal travel speed has been found satisfactory to represent such single average size automobile. Continued oscillation of the multivibrator upon reception of a Doppler signal of a relatively constant and average amplitude, over a period of time so as to provide multiple pulses 1.8 seconds apart, has been found to approximate the volume of traffic passing under the detector, each two pulses approximating a vehicle of the average size automobile.

It should be understood that the examples of time given above are not meant to limit the invention to such time lengths, as other pulse rates, faster or slower and pulse lengths, longer or short may be used, as desired.

It should be further understood that the band pass of from 10 cycles per second to 40 cycles per second has been used as one band pass that may be employed as part of the overall vehicle detector. However, such band pass may be reduced by lowering the low frequency end of the low pass filter so as to reduce the upper frequency level of the band pass thus providing a narrower and lower band pass.

The lower frequency level of the band pass may be reduced somewhat to a lower frequency but it has been found that a band pass with a low level frequency of, for example 7 cycles per second, is sufficiently low to provide detection of very slow moving vehicles and is sufficiently high so as to eliminate passage of spurious noise and electrical disturbance within the very low frequency range with a transmitted frequency of 2455 megacycles.

The width of the band pass may reasonably be reduced to one cycle, for example, if the band pass is very low, as for example of the order of between 7 cycles to 12 cycles per second, and still provide for detection of very slow to very fast moving vehicles passing substantially under the antenna.

By reducing the width of the band pass, the length of the actuation range within the detection zone along the roadway may be substantially reduced.

It should also be understood that the filtering networks particularly illustrated in FIG. 5, sections 42 and 44 are illustrative of one type or combination of filtering networks that may be used and other types or combinations of filtering networks may be used that provide the desired band pass.

It has been found satisfactory to require at least five volts D.C. above ground through resistance 146 for operation of the multivibrator output section. This provides for elimination of output pulses which may be produced by electrical noise in the circuitry of the detector.

It may occur in the employment of the present radar vehicle detector for detecting vehicles on the roadway that a relatively weak, short Doppler signal is received such as that Doppler signal reflected from a single rather fast moving small vehicle. Such relatively weak, short Doppler signal may produce a low amplitude positive D.C. voltage through resistor 146 just above the minimum limit for operation of the multivibrator, the D.C. voltage being of short duration.

Under such circumstances the low positive D.C. voltage of short duration may cause operation of the tube section 155 thus producing a pulse of the relay in its plate circuit, but the D.C. voltage being of short duration may be insufficient to charge the capacitor 177 sufficiently high to produce the second pulsing of the relay upon termination of the D.C. voltage through resistance 146. Thus a single output pulse may be produced.

The relay 200 controls its contacts 199 to close upon energization of the relay. The contacts 199 may control a repeater circuit or an energizing circuit for another relay remotely located. It may be desired to open a circuit or pair of contacts by energization of relay 200. This could be done by employing normally closed contacts that would open, upon energization of relay 200.

The preferred form of the invention has been described employing ultra high frequency radio wave generation, transmission and reception with an ultra high frequency of 2455 megacycles as an example that may be used as part of the detection means. Obviously the ultra high frequency radio wave energy generated and transmitted may be substantially increased in frequency, up to some ten times such 2455 megacycles for example if desired.

If, for example, the generated and transmitted ultra high frequency radio wave energy of the detection means were increased in frequency to approximately ten times the frequency of the example frequency of 2455 megacycles, then the Doppler shift frequency produced by reflection from a moving object would be increased in frequency linearly over the Doppler shift frequency produced by the same object moving at the same speed reflecting ultra high frequency radio waves at the example frequency of 2455 megacycles.

Therefore if a detection means, generating and transmitting a somewhat higher frequency than 2455 megacycles were to be employed in the present invention it may be necessary to increase the peak frequency of the band pass as well as to widen the band pass provided by the filter network dependnig upon the amount of increase in frequency used.

When the cosine factor is taken into consideration, as previously explained, the Doppler effect is reduced somewhat so that for a detection means generating and transmitting a frequency of, for example 24,550 megacycles a filter network providing a band pass of for example from 50 cycles per second to 140 cycles per second, with the band pass peaked at 95 cycles per second may be found sufficiently high in frequency and sufficiently wide to provide multiple pulses for detection of from very slow moving vehicles to very fast moving vehicle passing substantially under the antenna.

Of course the frequency and width of the band pass, although not linear with the increase of the frequency of the detection means, may be adjusted, as desired, for the desired response of the multiple pulse means to detection means provided.

Although the preferred form of the invention has been described as employing the transmission and reception of ultra high frequency radio wave energy or microwave energy for developing the Doppler beat frequency used in the present system of detecting moving vehicles and providing a multiple output pulse therefrom for providing improved response to or indication of vehicle traffic, other radiant wave energy means might be employed to develop a Doppler beat frequency in a similar manner as by the transmission and reception of supersonic or ultra sonic waves in air, the latter waves being similar to sound waves above audible frequencies for example.

Supersonic waves of frequency of the order of 25,000 cycles per second may be directed in divergent beam form as illustrated in FIGS. 1, 2 and 3 and the mixture of transmitted and reflected waves will provide a Doppler beat frequency of the order of ten times that obtained with the example frequency of 2455 megacycle radio wave transmission described above, but comparable to the beat frequency obtained from radio wave transmission at 25,000 megacycles, which has comparable wave length, for example. Radio waves of the length produced by the frequencies of 2455 megacycles and above are normally considered microwaves. Thus the electrical signal of Doppler beat frequency derived from rectification of the mixture of electrical waves corresponding to the supersonic transmitted waves and the electrical waves corresponding to the received reflected waves may be applied to the circuitry corresponding to the block diagram to the right of the oscillator-detector 41 of FIG. 4, in the same manner as that from the mixture of transmitted and reflected radio waves as described above.

A vehicle detector for employing supersonic radiant energy detection means may be similar in many respects to the vehicle detector employing ultra high frequency radio energy detection means represented in block form in FIG. 4. The oscillator-detector associated with supersonic radiant energy detection means may be of the ordinary type oscillator-detector for generating an electrical frequency of the order of 25,000 cycles per second, or 25 kilocycles while lead 40 would provide connection to an electrical acoustical transducer capable of converting the generated electrical frequency of 25 kilocycles to supersonic waves of comparable frequency, which supersonic waves may be considered microwaves, and directing these supersonic waves through air in the form of a beam. Such electrical acoustical transducer would be employed in lieu of the antenna represented by 21 in FIG. 4.

Reception of the projected supersonic waves, Doppler shifted in frequency may be made by a reverse electrical acoustical transducer capable of receiving and detecting supersonic waves within the general range of frequency of the projected supersonic waves which converts the received supersonic waves now Doppler shifted in frequency into electrical waves of comparable frequency. The electrical waves, comparable in electrical frequency to the frequency of the received supersonic waves may be applied to the oscillator-detector in which the Doppler beat frequency is developed.

Processing this Doppler beat frequency would be similar to that described above relative to the vehicle detector employing radio wave detection means. This alternate method would then provide a vehicle detector for employing supersonic detection means to provide multiple pulses in response to or indication of vehicle traffic.

Accordingly, among others, the several objects of the invention as specifically aforenoted are achieved.

Although a number of alternate forms of arrangements according to the invention have been pointed out above, it will be obvious to those skilled in the art that other modifications of in construction and rearrangements of the parts might be resorted to without departing from the spirit of the invention as defined by the claims.

I claim:

1. A system for detecting vehicles proceeding along a traffic path, including means for transmitting radiant wave energy in a beam at an angle to said traffic path and receiving such wave energy as reflected from one or more vehicles passing through said angled beam, means for deriving a Doppler beat frequency signal from said transmitted and received reflected waves, and means controlled by the amplitude of said Doppler signal providing multiple output pulses in response to said signal to give the effect of more Doppler signals than the number of Doppler signals actually obtained from such vehicles.

2. A system is in claim 1 in which said last named means includes a periodic pulse generator for providing output pulses periodically in accordance with the time length of sustained said Doppler signal from one or more vehicles passing through said beam.

3. A system as in claim 2 in which said periodic pulse generator includes a multivibrator controlled by the amplitude of said Doppler signal.

4. A system as in claim 3 and which includes means for initiating operation of said multivibrator to provide an output pulse in response to said Doppler signal rising above a predetermined amplitude and means for reoperating said multivibrator to provide an additional output pulse in response to decrease of said Doppler signal below a predetermined amplitude.

5. A system as in claim 4 and including means for increasing the pulse rate of said multivibrator in accordance with amplitude of said Doppler signal whereby more pulses per unit of time will be provided for large vehicles and for multiple adjacent vehicles passing through said beam.

6. A system as in claim 5 and including means for actuating said multivibrator to provide an output pulse in response to each substantial change of Doppler signal amplitude above the predetermined amplitude.

7. A system as in claim 1 in which said last named means includes a periodic pulse generator for providing output pulses at a time spacing of the order of two seconds for any sustained Doppler signal of substantial amplitude and exceeding such period in time length.

8. A system as in claim 1 in which said last named means includes a periodic pulse generator for providing output pulses at a time spacing of the order of a few seconds for any sustained Doppler signal of substantial amplitude and exceeding such period in time length.

9. A vehicle detection system for road traffic including a generator of ultra-high frequency waves, means including a directional antenna disposed above a roadway and mounted at a slight angle for transmitting a beam of said ultra high frequency waves from said generator downward over a limited width of said roadway directly in the path of vehicle traffic and angled slightly from the vertical for a limited distance along such path and for receiving back and supplying to said generator reflections of such waves as shifted in frequency by the Doppler effect of a vehicle passing through said beam, means for deriving a Doppler beat frequency signal from the generated and reflected waves, means for selecting a narrow band of frequency of said Doppler signal in the audio and subaudio range corresponding to passage of the vehicle through a part of said beam, means for amplifying said selected signal in said narrow band of frequency, rectifier means to provide a direct current voltage proportional to the amplitude of said signal of said narrow band of frequency, means responsive to said direct current voltage to provide brief multiple pulses as a vehicle passes through the part of said beam and means connected to said responsive means to be controlled by the output of the latter in response to such passage of a vehicle.

10. A combination as in claim 9 in which said responsive means includes means for providing multiple brief output pulses varying in number in direct proportion to the length of time said vehicle is passing through the part of said beam.

11. A combination as in claim 9 in which said responsive means includes means for providing multiple brief output pulses, the number of said pulses per unit time being substantially proportional to the amplitude of said reflections of such waves as shifted in frequency by the Doppler effect of two or more vehicles passing through said beam concurrently.

12. A combination as in claim 9 in which said responsive means includes means for deriving multiple brief output pulses initiated at one pulsation frequency as by one amplitude of said reflection of such waves as shifted in frequency by the Doppler effect and continuing at an increased pulsation frequency as by an increased amplitude of said reflection of such waves over said one amplitude of said reflection of such waves.

13. A combination as in claim 9 in which said responsive means includes means for deriving multiple brief output pulses initiated at one pulsation frequency as by one amplitude of said reflection of such waves as shifted in frequency by the Doppler effect and continuing at a decreased pulsation frequency as by a decreased amplitude to above a minimum amplitude of said reflection of such waves below said one amplitude of said reflection of such waves.

14. A combination as in claim 9 in which said responsive means includes means for deriving brief multiple output pulses in response to said direct current voltage and a final one brief output pulse immediately after termination of said direct current voltage.

15. In combination, means mounted over a roadway for transmitting a narrow beam of ultra-high frequency radio wave energy downward on to said roadway at a slight angle from the vertical along the line of travel of vehicles moving along said roadway and for receiving back reflected radio wave energy and for mixing said transmitted and reflected radio wave energies, means for deriving Doppler beat frequencys caused by the mixing of said transmitted radio wave energy shifted in frequency by the Doppler effect of the component of vehicle speed caused by movement of the said vehicle along the said roadway through the said narrow beam, means for amplifying said beat frequency, means for filtering said beat frequency to derive a very low frequency component therefrom, means for amplifying said very low frequency component, means for rectifying said very low frequency component to provide a direct current voltage substantially proportional to the amplitude of the said very low frequency component, a multivibrator responsive to said direct current voltage, the frequency of the said multivibrator being directly proportional to the amplitude of the said direct current voltage, and output means in the plate circuit of one of the tube sections of the said multivibrator.

16. A combination as in claim 15 and which said output means includes an electromagnetic relay.

17. A combination as in claim 15 and including a resistance-capacitance timing circuit which, in cooperation with the amount of said direct current voltage controls the frequency of oscillation of said multivibrator.

18. A combination as in claim 15 and including electrical storage means providing for one final oscillation of said multivibrator immediately after the said direct current voltage decreases toward zero to below the minimum amplitude.

19. A combination as in claim 15 and including a resistance capacitance and diode differentiating circuit for control of the grid of one tube section of said multi-vibrator for responding to any substantial increase in said direct current voltage to reverse the normal conduction and non-conduction conductions to render said one tube section conducting and the other section non-conducting for a brief time period, and including a further resistance capacitance and diode differentiating circuit for control of the grid of the other tube section of said multivibrator for responding to any substantial decrease in said direct current voltage to so reverse the normal conduction and non-conduction conditions to render said other tube sections non-conducting and said one tube conducting for a brief period, said multivibrator including relaxation circuits for restoring the said normal conditions between said reversals and for periodically further reversing the same in response to sustained substantial said direct current voltage between said increase and said decrease.

20. In a system for detecting vehicles proceeding along a traffic path and having means for providing a Doppler beat frequency signal by transmission of radiant wave energy in a beam at an angle to said traffic path and reception of such wave energy as reflected from one or more vehicles passing through said angled beam, the improvement comprising periodic pulse generating means controlled by said signal for providing periodic output pulses in response to any substantially prolonged said signal with the number of pulses substantially proportional to the length of time said signal is sustained.

21. In a system for detecting vehicles proceeding along a traffic path and having means for providing a Doppler beat frequency signal by transmission of radiant wave energy in a beam at an angle to said traffic path and reception of such wave energy as reflected from one or more vehicles passing through said angled beam, the improvement comprising a periodic pulse generator controlled by said signal for generating multiple output pulses in response to a sustained said Doppler signal for simulating a succession of closely spaced vehicles where the signals from different adjacent vehicles proceeding along said path partially overlap to cause a single prolonged sustained signal.

22. In a system for detecting vehicle proceeding along a traffic path and having means for providing a Doppler beat frequency signal by transmission of radiant wave energy in a beam at an angle to said traffic path and reception of such wave energy as reflected from one or more vehicles passing through said angled beam, the improvement comprising a multivibrator controlled by said signal to provide periodic output pulses the number of which are substantially proportional to the length of time said signal is sustained.

23. In a system for detecting vehicles proceeding along a traffic path and having means for providing a Doppler beat frequency signal by transmission of radiant wave energy in a beam at an angle to said traffic path and reception of such wave energy as reflected from one or more vehicles passing through said angled beam, the improvement comprising a multivibrator controlled by said signal to provide periodic pulses, and a relay controlled by said output pulses.

24. In a vehicular traffic detector for a roadway and having means for transmitting a beam of micro-waves downward on to and along the roadway at a slight angle from vertical and receiving some of said micro-waves as reflected from a vehicle proceeding along the roadway in said beam and comparing the transmitted and received waves to provide an electrical output signal therefrom as a vehicle passes through said beam, the improvement which comprises means controlled by said electrical output signal to provide periodic electrical output pulses at time spacing approximately the normal minimum time spacing between successive closely spaced passenger vehicles proceeding at ordinary traffic speeds, so long as said electrical output signal continues.

25. A vehicle traffic detector as in claim 24 and in which such time spacing is of the order of two seconds.

26. A vehicle traffic detector as in claim 24 and said improvement including means for reducing the time spacing of such pulses with increasing amplitude of said reflected waves.

27. An electrical apparatus for detecting vehicles proceeding along a roadway, means adjacent the roadway for transmitting a divergent beam of radiant wave energy across the path of said vehicles and angled slightly from a perpendicular to said path, said wave energy being of microwave length to be reflected substantially from such vehicles, means for receiving said reflected wave energy as shifted in frequency by the Doppler effect from the varying component in the direction of said transmitting and receiving means of the movement of said vehicle along said path, means for mixing the reflected and transmitted waves to provide an electrical signal therefrom as a vehicle is passing through said beam, means controlled by said electrical signal for providing output pulses of number substantially proportional to the number of vehicles passing individually through said beam at substantial spacing and speed such as to provide individual brief said electrical signals therefrom, and providing means for multiple periodic output pulses in response to any substantially sustained said signal from prolonged passage of one or more vehicles through said beam without interruption for the period of said periodic output pulses, whereby successive multiple output pulses will be provided to simulate a succession of vehicles in event of said signal being sustained by partially overlapping passage of vehicles through said beam or by passage of a relatively long slowly moving vehicle through said beam.

References Cited in the file of this patent

UNITED STATES PATENTS

| | | |
|---|---|---|
| 2,524,610 | Storm | Oct. 3, 1950 |
| 2,620,470 | Rather | Dec. 2, 1952 |